United States Patent [19]

Dearden et al.

[11] Patent Number: 4,582,348

[45] Date of Patent: Apr. 15, 1986

[54] PIPE CONNECTOR WITH VARIED THREAD PITCH

[75] Inventors: Geoffrey C. Dearden; Edward J. Speare, both of Bedford; Katsuo Ueno, Hertfordshire, all of England; Donald N. Jones, Aberdeenshire, Scotland

[73] Assignees: Hunting Oilfield Services (UK) Limited, Aberdee, Scotland; Kawasaki Steel Corporation, Kobe, Japan

[21] Appl. No.: 645,048

[22] Filed: Aug. 28, 1984

[30] Foreign Application Priority Data

Aug. 31, 1983 [GB] United Kingdom ............... 8323348

[51] Int. Cl.$^4$ ............................................. F16L 15/04
[52] U.S. Cl. ..................... 285/175; 285/334; 285/390; 411/413; 411/263
[58] Field of Search ............. 285/332.4, 333, 334, 285/334.4, 355, 390, 391, 175; 403/47; 411/413, 290, 263

[56] References Cited

U.S. PATENT DOCUMENTS

| 720,578 | 2/1903 | Greenfield | 285/175 |
|---|---|---|---|
| 3,050,318 | 8/1962 | Van Der Wissel | 285/334 |
| 3,210,096 | 10/1965 | Van Der Wissel | 285/334 |
| 3,994,516 | 11/1976 | Fredd | 285/175 |
| 4,113,290 | 9/1978 | Miida | 285/334 |
| 4,121,862 | 10/1978 | Greer | 285/333 |
| 4,346,920 | 8/1982 | Dailey | 285/334 |
| 4,423,893 | 1/1984 | Holmes | 285/334 |

FOREIGN PATENT DOCUMENTS

48111 11/1981 United Kingdom ............... 285/333

Primary Examiner—Cornelius J. Husar
Assistant Examiner—Eric K. Nicholson
Attorney, Agent, or Firm—Balogh, Osann, Kramer, Dvorak, Genova & Traub

[57] ABSTRACT

A connector, for example for connecting a tubular member such as a pipe, comprises a male member which has an external frusto-conical surface provided with a thread and a female member having an internal frusto-conical surface provided with a thread for engagement with the thread of the male member. The members are provided with sealing surfaces which are brought into sealing abutment under an axially directed compressive force when the members are fully engaged together, as a result of which one member is partly compressed and the other tensioned. To improve the load distribution along the threads of the members, the pitch of the thread is varied along the axial length of the threaded surfaces. Specifically the surfaces are divided into three portions, an intermediate portion in which the pitches of the threads of the members are the same, and end portions at either end of the intermediate portion, in which the pitches of the threads differ. In the end portions closest to the sealing surfaces, the pitch of the thread of the one member, which is compressed during full engagement of the members, is greater than the pitch of the thread of the other member, and in the other end portion the pitch of the thread of the one member is smaller than the pitch of the thread of the other member.

21 Claims, 9 Drawing Figures

FIG_2B

PIPE CONNECTOR WITH VARIED THREAD PITCH

BACKGROUND OF THE INVENTION

1. Field of the Invention

The present invention relates to connectors for connecting members, such for example as pipe connectors for connecting pipes particularly but not exclusively for use in conveying pressurized fluids for example in oil and gas exploration and production.

2. Description of the Prior Art

The main type of connector presently used in oil and gas exploration and production for connecting tubings and casings comprises a female member having an internal frusto-conical circumferential surface provided with a thread of constant pitch, and a male member having an external correspondingly frusto-conical circumferential surface and provided with a thread having the same pitch as the thread of the female member and for threaded engagement with the female member. Sealing of the connector is obtained by causing a generally axially directed sealing surface on the free end of the male member to abut against a corresponding sealing surface of the female member under an axial compressive force. This force is obtained by screwing the members together tightly causing compression of the male member and extension of the female member and is usually maintained by providing an interference fit between crest and root surfaces of the threads.

Pipe connectors of the type have been found to have a number of substantial disadvantages. The axial compressive stress in the male member and the associated tensile stress in the female member required to force the sealing surfaces into sealing contact, is borne predominantly by only the last few turns of the thread adjacent the sealing surfaces, the remainder of the turns of the threads being at most very lightly loaded. Consequently the load bearing leading flanks of the loaded turns of the thread experience substantial loads while sliding relative to one another to bring the sealing surfaces into compressive contact. Additionally, while increasing the radial interference between the threads of the members will reduce the tendency of the members to unscrew or back-off, the resulting hoop stresses in the female member, particularly when increased under the influence of internal pressure, can exceed the stresses at which the material of the member will yield. Furthermore high hoop stresses and high flank loading can produce galling of the flank and crest and root surfaces of the threads.

The relatively short axial distance between the load bearing turns of the threads and the sealing surfaces limits the strain energy induced in the members so that a slight relative axial movement of the members of the connector can significantly reduce the integrity of the seal between the sealing surfaces. Not only is the strain energy limited but also the angle through which the members are rotated in producing the sealing force on the sealing surfaces is limited so that any slight tendency of the members to unscrew or back-off, for example resulting from a lateral blow to one of the members, will cause a significant reduction in the compressive loading of the sealing surfaces.

SUMMARY OF THE INVENTION

It is a primary object of the invention to provide an improved pipe connector which eliminates all the disadvantages above described.

It is another object of the invention to provide a pipe connector capable of uniformly distributing load such as tensile or compressive forces acting upon male and female members of the connector to greatly reduce the maximum load on flanks of turns of threads formed in the members, thereby enhancing the fatigue life of the connector.

It is a further object of the invention to provide a pipe connector capable of uniformly distributing load such as tensile or compressive forces acting upon male and female members of the connector so as to rotate the members through a substantially greater angle than with the known connector to achieve a required loading on sealing surfaces of the members, thereby preventing loss of integrity of seal provided by sealing surfaces only by a relatively small angular rotation of the members.

According to one aspect of the present invention there is provided a connector including a female member having an internal circumferential surface provided with a thread, and a male member having an external circumferential surface provided with a thread for threaded engagement with the thread of the female member, the male member being provided adjacent one end of the threaded surface thereof with an annular sealing surface, which lies in a plane substantially perpendicular to the central axis of the connection of the male and female members, when the male and female members are fully engaged together, and which is brought into sealing abutment with an annular sealing surface associated with the female member, which also lies in a plane substantially perpendicular to the central axis of the connection of the male and female members, under an axially directed force, wherein in an intermediate portion of the threaded surfaces of the members intermediate the ends, the threads of the members have the same pitch, and in one end portion of the threaded surface of the male member and the corresponding one end portion of the threaded surface of the female member, the one end portions extending between the intermediate portions and the sealing surfaces, the pitch of the thread of one member differs from the pitch of the thread of the other member, such that, as the members are screwed together, on abutment of the sealing surfaces, a part at least of one flank of the thread of one member in the intermediate portion abuts the corresponding part of the corresponding one flank of the thread of the other member in the intermediate portion, and, as the axial load on the sealing surfaces increases, the one flanks of the threads in the intermediate portion are progressively loaded and the one flanks of the threads of the members in the one end portion are progressively brought into abutment and loaded.

According to another aspect of the present invention there is provided a connector including a female member having an internal circumferential surface provided with a thread, and a male member having an external circumferential surface provided with a thread for threaded engagement with the thread of the female member, the male member being provided adjacent one end of the threaded surface thereof with an annular generally axially directed sealing surface which is, when the male and female members are fully engaged together, brought into abutment with an annular generally axially directed sealing surface associated with the female member under an axially directed force which places part at least of one member in compression and part at least of the other member in tension, wherein in an intermediate portion of the threaded surfaces of the members intermediate the ends, the threads of the members have the same pitch, and in one end portion of the threaded surfaces extending between the intermediate portion and the sealing surfaces, the pitch of the thread of the one member is greater than the pitch of the thread of the other member.

The male member may be formed on the end of a member to be connected thereby or may be made separately and may be fixed, for example permanently, for example by welding, or otherwise to the end of the member, and the female member similarly may be formed on the end of a member to be connected thereby or may be made separately and fixed or otherwise connected to the member. The female member may be made integral with or otherwise fixed to part of another connector for connection to the member. When the female member is made separately, the sealing surface associated therewith may be provided either by a surface of the member itself or by a surface of a member already engaged with the female member.

The circumferential surfaces of the members may be cylindrical or frusto-conical and tapering towards the free end of the male member.

The sealing surfaces may be provided at or adjacent the free end of the male member and internally in the female member, or may be provided at or adjacent the free end of the female member and by an external surface on the male member. The sealing surfaces may extend in radial planes or may be frusto-conical or curved, e.g. convex or concave, or in part radial and/or frusto-conical and/or curved. The surfaces may have the same shape or may be differently shaped and deformed into full abutment or full engagement of the members. For example the sealing surfaces may be as described in either of copending application Nos. 8323508 and 8414203.

The thread of one of the members may have the same pitch in the intermediate and one end portions, with the thread of the other member having different pitches in the intermediate and one end portions, the pitch in the one end portion being larger or smaller as required. For example, when the male member's sealing surface is provided at or adjacent the free end thereof, the pitch of the thread of the male member may be the same in the intermediate and one end portions, with the pitch of the thread of the female member in the one end portion being smaller than that of the thread in its intermediate portion.

To improve the distribution of the load along the threads, on application of an axial tensile load to a made up connector, there may also be a pitch difference between threads of the members in the other end portions of the threaded surfaces, so that when the connected members are subject to an axial tensile force, initially the force will be taken by the thread turns in at least the intermediate portion and the parts of the other end portion immediately adjacent thereto, the turns of the threads at the free end of the other end portion being progressively loaded.

The pitch of the threads in the other end portion of the one member which was under compression during engagement of the members may be smaller than the pitch of the thread of the other end portion of the other member.

This modification has the advantages of enhancing the fatigue life of the connector and, where the thread in the other end portion of one of the members is "vanishing", i.e. has a progressively reducing radial extent.

The pitch difference in the other end portion of the threaded surfaces may be achieved by maintaining constant the pitch of the thread of one of the members in both the intermediate and the other end portions and by increasing or reducing the pitch of the thread in the other end portion of the other one of the members, relative to the pitch of the thread in its intermediate portion. For example, when the male member's sealing surface is provided at or adjacent the free end thereof, the pitch of the thread of the male member may be maintained constant over the intermediate and one end portions, while the pitch of the thread in the one end portion of the female member may be decreased relative to that of its intermediate and other end portions which are the same.

The threads on the members are advantageously shaped to provide a clearance between the other or trailing flanks and, when the members are fully engaged together, a clearance, contact, or a slight interference may be provided between the crest surfaces of one thread and the root surfaces of the gaps between the turns of the other thread, a clearance being provided between the crest surfaces of the other thread and root surfaces of the one thread.

In changing the pitch of the thread, one or both of the axial thickness of the thread and the axial width of the gap between adjacent turns of the thread may change. Advantageously the threads are made with a gap between adjacent turns having a constant axial width so that the axial width of the thread is varied to vary the pitch.

Embodiments according to the present invention will now be described by way of example only, with reference to the accompanying drawings.

DETAILED DESCRIPTION OF THE PREFERRED EMBODIMENT

Figure 1:
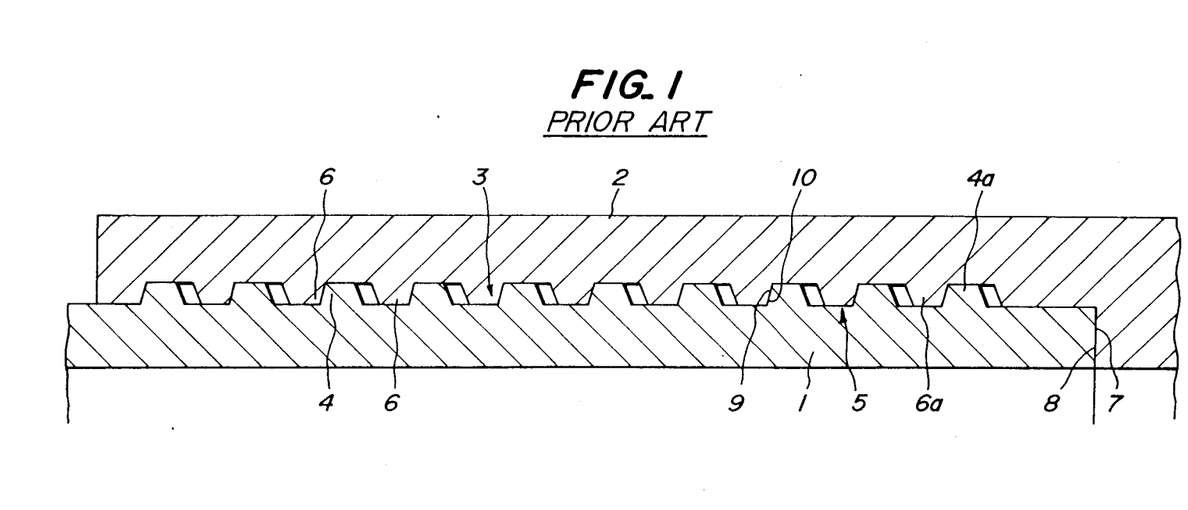
FIG. 1 is a diagrammatic part sectional view of a known type of pipe connector.

The known pipe connector shown very diagrammatically in FIG. 1 comprises a male member 1 which is made or formed integrally with the end of a pipe and a female member 2 which forms part of a sleeve, and the other end of which is similarly associated with another male member. The male member 1 has an external frusto-conical surface 3 provided with a thread 4 having a constant pitch throughout its length. The female member 2 has an internal frusto-conical surface 5, corresponding to surface 3, and provided with a thread 6 having the same pitch as thread 4. The free end of male member 1 has an annular radial sealing surface 7 which, when the members are fully engaged together is in abutment with an internal annular radial surface 8 on the female member 2.

Figure 2A:
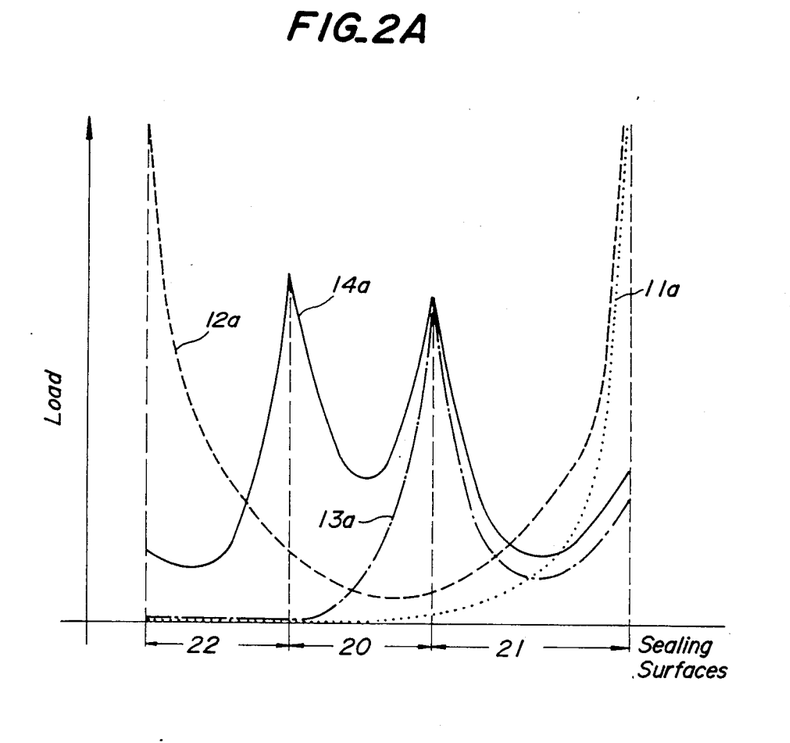
FIG. 2 is graphs showing the load on each thread turn for a known type of pipe connector and for embodiments of pipe connector according to the present invention.
Figure 2B:
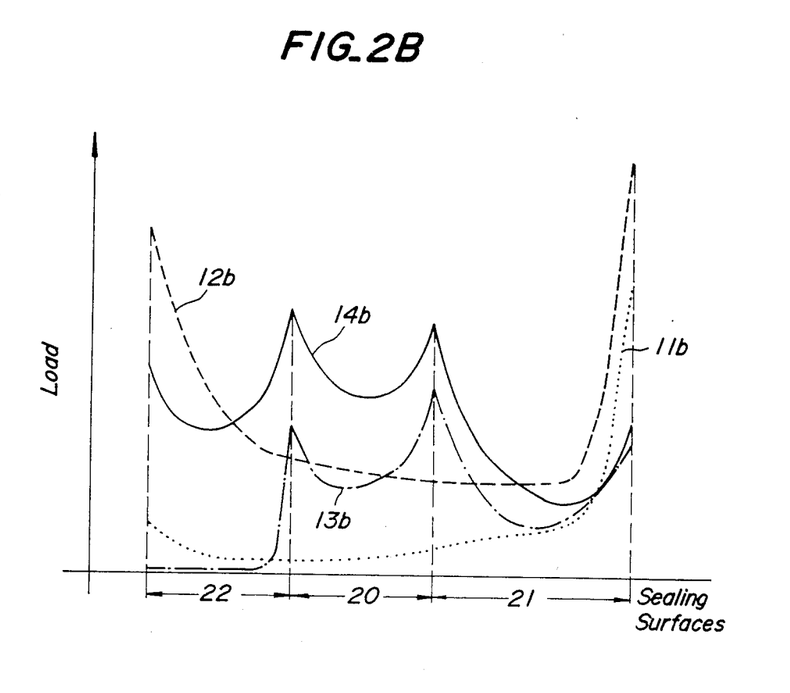

To make up the above connector, the members 1, 2 are screwed together until the surfaces 7, 8 are brought into abutment, at which point the leading flanks 9, 10 of the threads 4, 6 respectively are also in abutment. The members are then further screwed together to load the abutted surfaces 7, 8. The reactive force is taken by the leading flanks 9, 10 of the first run 4a, 6a of the threads 4, 6 with substantially less load being taken by the second, third, etc. turns. The dotted lines 11a and 11b of FIGS. 2A and 2B show a typical load taken by the thread turns where there is no interference and where there is an interference fit respectively between the crest and root surfaces of the threads. The effect of loading surfaces 7, 8 is to compress the male member (and correspondingly extend the female member) and thereby induce strain energy therein. However the main compression and extension takes place between those thread turns which bear the substantial part of the load and the sealing surfaces 7, 8 and therefore a relatively short length at the free end of the male member is compressed to any substantial degree.

Because of this disadvantageous load distribution along the threads 4, 6 as described above, the relative angle through which the members are rotated to achieve loading of the surfaces 7, 8 is relatively small. It will thus be appreciated that a relatively small angular rotation of the members tending to unscrew the members will substantially reduce the integrity of the seal provided by surfaces 7 and 8. The resistance to unscrewing is provided by friction between the leading flanks of the threads and is usually increased by providing an interference fit between the crest and root surfaces of the threads but, again, there is a limit to the degree of interference that can be provided because of the consequential hoop stresses in the members and the risks of galling of the flank, crest and root surfaces of the threads.

Finally, when the above connector is subject to an axial tensile stress, the effect is mainly borne by the turns of the threads at the two ends of the threaded surfaces, as shown by the broken line 12 in FIG. 2. Particularly where one of the two members has at the end remote from surfaces 7, 8 a vanishing thread so that the area of contact between the leading flanks of the teeth is substantially reduced particularly in the last few turns, the imposition of substantial loads on application of an axial tensile force can cause the female member to "unzip" or deform radially outwardly providing the potential for failure of the connector.

Figure 3:
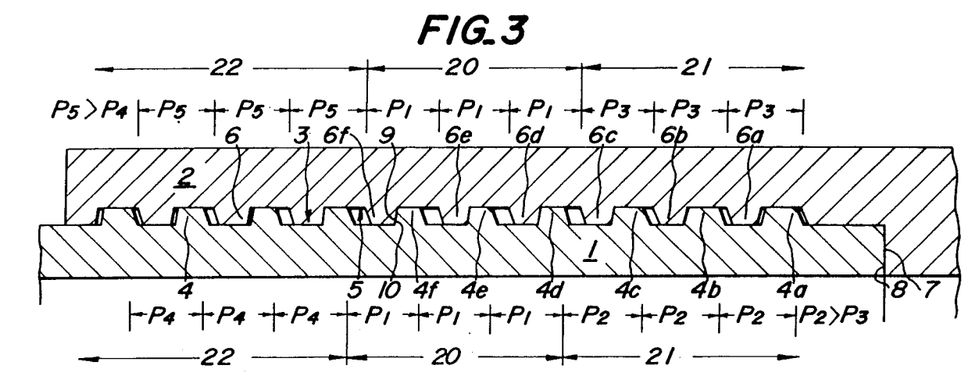
FIG. 3 is a diagrammatic part sectional view of an embodiment of pipe connector according to the present invention.

An embodiment of a connector according to the present invention for connecting pipes is shown diagrammatically in FIG. 3 and parts corresponding to those of the known connector of FIG. 1 are designated by the same reference numerals. Specifically the connector comprises a male member 1 provided with an external peripheral frusto-conical surface 3 which is provided with a thread 4, and a sealing surface 7, and a female member 2 provided with an internal circumferential frusto-conical surface 5 with a thread 6, and a sealing surface 8. The threaded surfaces of the connector of FIG. 3 comprise three portions, an intermediate portion 20 intermediate the ends of the threads, an end portion 21 between portion 20 and the ends of the threads adjacent sealing surfaces 7 and 8, and an end portion 22 between portion 20 and the other ends of the threads. In portion 20 the pitches P1 of the threads of the two members are the same. In portion 21 the pitch P2 of the thread of the male member is greater than the pitch P3 of the thread of the female member. This difference in pitch in end portion 21 can be achieved by modifying the pitch of either or both of the threads but, as shown, is obtained by providing thread 6 with the same pitch as in its intermediate portion 20, i.e. making P3 equal to P1 and by increasing the pitch P2 of the thread 4 of the male member relative to the pitch P1 of its intermediate portion 20. In portion 22 the pitch P5 of the thread 6 of the female member is greater than the pitch P4 of the thread 4 of the male member. This can be achieved by changing either or both thread pitches and, as shown, it is obtained by making the pitch P4 of thread 4 the same as in its intermediate portion and by increasing the pitch P5 of thread 6 relative to its pitch P1 in the intermediate portion. Pitches P2 and P5 may be the same or different depending on the compressive load on the sealing surfaces and the tensile load sustained.

The threads 4, 6 of the connector of FIG. 3 may be dimensioned so that on full engagement of the members there is an interference fit between the crest surface of one thread and the root surface of the gap between the other thread but the degree of interference can be substantially reduced as compared with that required for a known connector because of the tendency to unscrew or back-off because of the increased energy stored in portions of the connector adjacent the sealing surfaces 7, 8. The interference may however be reduced to zero and a clearance provided between the root and crest surfaces, but advantageously there is at least contact between the crest surface of one thread and the root surface of the gap between the other thread.

With the above described arrangement, when the members 1, 2 have been screwed together sufficient to bring surfaces 7, 8 into contact, part at least of the leading flanks 9, 10 of the thread turns in the intermediate portion 20 are in abutment. Further tightening of the connector will cause these turns to be loaded progressively and will progressively load the leading flanks of the turns of the thread in the end portion 21.

The order and way in which the thread turns in the intermediate and one end portions 20, 21 are loaded depends on whether or not there is an interference fit between crest and root surfaces of the threads. In the absence of an interference fit, loading progresses from the turns 4d, 6d at the end of the intermediate portion 20 closest to the end portion 21, progressively along the turns of the intermediate portion 20 and along the turns of the end portion 21 starting with turn 4c, 6c, continuing with turn 4b, 6b and ending with turn 4a, 6a. The full loading distribution is shown by dot-dash line 13a in FIG. 2A. With an interference fit, loading of the intermediate portion varies with more of the load being taken up, and sooner, by the turns 4f, 6f adjacent the other end of the intermediate portion 20. The full load distribution is shown by dot-dash line 13b in FIG. 2B.

In compressing surfaces 7, 8 the axial length of the male member which is compressed (and the corresponding axial length of the female member which is extended under tensile forces) is well in excess of the distance between surfaces 7, 8 and the first few thread turns adjacent thereto. There is thus a substantially greater compressed volume of the male member and tensioned volume of the female member than with the known connector, which has a result that a substantially greater amount of energy is stored in the free end portion of the male member and in the corresponding portion of the female member, and that the members will have been rotated through a substantially greater angle, for example 200% greater than with the known connector, to achieve the same loading of the surfaces 7, 8. Furthermore, the maximum load on the leading flanks of the turns of the threads is substantially reduced as compared with the maximum load on the leading flanks of the turns of the threads of the known connector, which substantially reduces the risks of galling of the threads.

When the members of the connector of FIG. 3 are fully engaged, if the connector is not subject to any applied forces, the turns of the threads 4, 6 in portion 22 have little effect. However if the connector is subject to a tensile force, as the force is applied the load is initially borne by the turns of the threads in the intermediate and one end portions 20, 21, and the turns of the threads in the other end portion 22 immediately adjacent the intermediate portion. As the force increases the other turns of the threads in the end portion 22 are progressively loaded. The final loading of the turns of the threads is shown by the full lines 14a and 14b in FIGS. 2A and 2B, for the case where there is no interference and interference respectively between crest and root surfaces of the threads. The turns of the threads in end portion 22 are considerably less loaded than in the known connector which not only enhances the fatigue life of the connector but also, where either the male or the female thread in portion 22 in a "vanishing" thread of progressively reducing radial extent, substantially reduces or avoids any tendency of the female member to deform outwardly.

Figure 4:
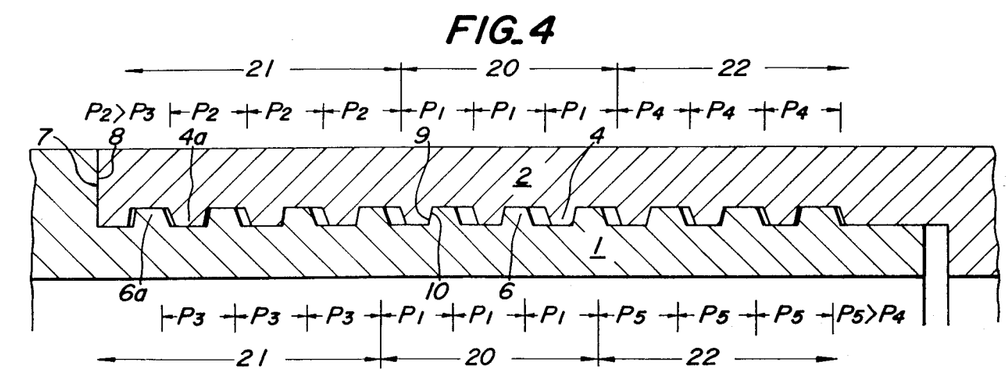
FIG. 4 is a diagrammatic part sectional view of another embodiment of pipe connector according to the present invention.

While in the above described connector, the sealing surfaces 7, 8 are provided at the free end of the male member and internally in the female member, they may alternatively be provided between the free end of the female member and externally on the male member, as shown in FIG. 4. In FIG. 4, like parts have been given the same reference numerals and the same pitch changes are involved in thread portions 20, 21 and 22 but, in effect, the thread pitch changes applied to the male member (which is the member which is placed under compression as the members are engaged together) in FIG. 3 are applied to the female member (which is the member which is placed under compression as the members are engaged together) in FIG. 4 and vice versa.

It will be appreciated that the threads 4, 6 are shown very diagrammatically in FIGS. 1, 3 and 4.

Figure 5:
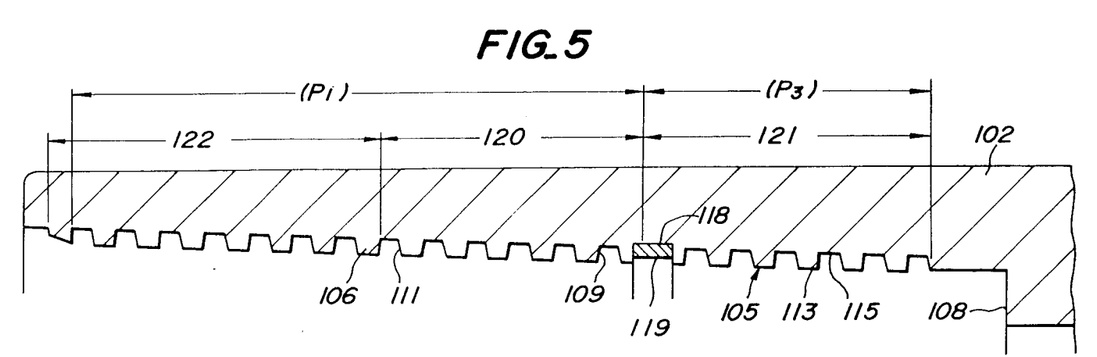
FIGS. 5 and 6 are part sectional views of the male and female members of a further embodiment of pipe connector according to the present invention.
Figure 6:
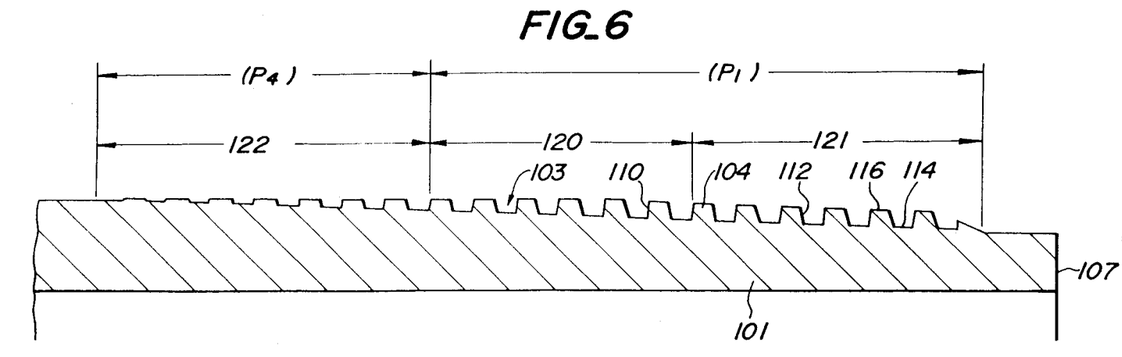
Figure 7:
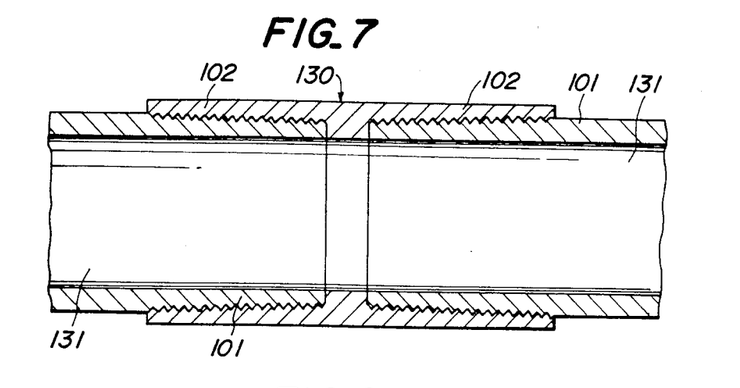
FIG. 7 is a diagrammatic sectional view of the connector of FIGS. 5 and 6.

FIGS. 5 and 6 show more realistically the female member 102 and male member 101 of a pipe connector of the type shown in FIG. 7, in which the female member 102 comprises a sleeve 130 having a female member 102 at each end, each for engagement with a male member 101 which is made or formed integrally with a respective pipe 131. As shown in FIG. 6, the male member has a radial sealing surface 107 at its free end and a thread 104 formed on an external circumferential frusto-conical surface 103. The thread comprises, in this particular embodiment, twenty turns of which the last seven at either end of the thread fall in end portions 121 and 122 respectively. The center six turns fall in intermediate portion 120. The turns in portions 120 and 121 all have the same pitch P1 and the turns in portion 122 have a smaller pitch P4. The thread in portion 122 is a vanishing thread in which the radial dimensions of the turns progressively reduce, the crest surfaces of the turns lying on a cylinder. The crest surface of the remainder of the turns of the thread lies on a frust-conical surface, as does the root surface between the turns of the thread, for the full extent of the thread. These frusto-conical surfaces have the same cone angle.

The female member 102 is provided with a radial sealing surface 108 and a circumferential internal frusto-conical surface 105 which is provided with a thread 106 having, as with the thread of the male member, twenty turns which are divided into an intermediate portion 120 and end portions 121 and 122. The turns of the thread 106 in portions 120 and 122 of the female member have the same pitch P1 and the pitch P3 of the turns of the thread of portion 121 is less than pitch P1. The thread 106 on the female member has a constant radial extent throughout, the crest and root surfaces lying on frusto-conical surfaces having the same conicity as the frusto-conical surfaces of the male member.

Figure 8:
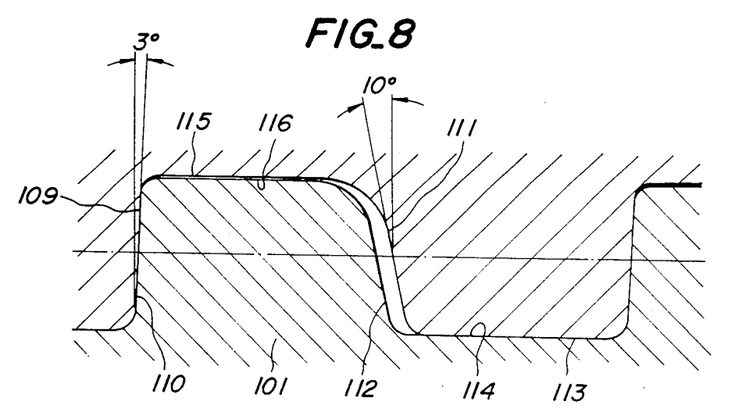
FIG. 8 is an enlarged view of an embodiment of thread used in the connector of FIGS. 5 and 6.

A preferred form of the thread of the connector of FIGS. 5 and 6 is shown in FIG. 8. As shown, the leading flanks 109 and 110 of the threads have a very slight inclination, for example 3°, to the radial plane and the trailing flanks 111, 112 have a greater inclination, for example of the order of 10°. The width of the thread is greater than its height, and the thread may advantageously be based on an API standard buttress thread. The width of the thread is selected in relation to the width of the gap between adjacent turns of the other thread such that in the absence of an applied axial force on the made-up connector, there is always clearance between flanks 111 and 112. As shown the radial extent of each thread in relation to the radial extent of the corresponding gap between the turns of the other thread is arranged so that the crest surface 114 of the thread of the female member at least contacts and may have an interference fit with the root surface 113 of the gap between adjacent turns of the thread of the male member. This ensures that contact or interference, if provided, is maintained over the full length of the threaded surfaces, despite the fact that the thread in portion 122 of the male member is vanishing. Correspondingly there may be a slight clearance between crest and root surfaces 115 and 116 of the thread of the male member and of the female member respectively. In a modification there may be a slight clearance between both pairs of crest and root surfaces 113, 114 and 115, 116.

Advantageously the threads in the male and female members are made using full width cutting tools which cut out a constant axial width gap between adjacent turns of the threads along the full length of each threaded surface. To obtain the pitch changes, the rate of axial advance of the member relative to the tool is modified, i.e. it is either increased or reduced, to change, i.e. to increase or reduce, the axial width of the thread portion and thereby increase or reduce its pitch. It will be appreciated that the axial width of the gap between adjacent turns of each of the threads is selected so that it will accommodate, with clearance between surfaces 111 and 112, the thread portions of various pitches involved.

It may be desirable to provide a secondary seal in addition to that provided by the surfaces 107 and 108 of the members and this may be achieved by creating an annular recess in the circumferential surface of one or other of the members and in which a seal is located. Such a recess 118 in the female member is shown in FIG. 5. Before interengagement of the members, a resiliently compressible annular seal 119, for example of Teflon (Trademark), is located in the recess 118 and is then compressed by the thread of the male member and seals against the appropriate turn of the thread. For optimum sealing effect, the recess is located to be engaged by a turn of the thread of the male member which has a full radial extent and at a point at which the adverse effects of removing a turn of the thread of the female member are minimized. As shown, the recess 118 is provided at the junction between the intermediate and end portions 120, 121.

In the above described embodiments, the threaded surfaces 3, 5 and 103, 105 of the members are described as being frusto-conical. It will be appreciated that these surfaces may be cylindrical. Additionally, it will be appreciated that the number of turns of the threads on the members will depend on the members and the loads which they have to sustain and are therefore variable as required. Similarly, the number of turns of the threads in each of the three portions of the threaded surfaces may be varied to optimize the required effects.

While as described, sealing surfaces 7, 8 and 107 and 108 are radial surfaces, it will be appreciated that these may take other forms, the main requirement being that they be generally axially directed so as to be subject to axial forces to urge them into sealing contact. They may for example be frusto-conical surfaces or comprise two frusto-conical surfaces of opposite conicity which merge together with a generally V-section radial profile. Alternatively, they may be curved, for example convex or concave, or in part radial and/or frusto-conical and/or curved. The surfaces may initially have different shapes and, with axial compression, be deformed to the same general shape. The surfaces may be provided with one or more grooves provided with sealing rings or may be coated with a sealing material, e.g. Teflon, to improve the seal provided thereby. They may for example have the forms described in copending U.K. Patent Application No. 8414203.

Figure 9:
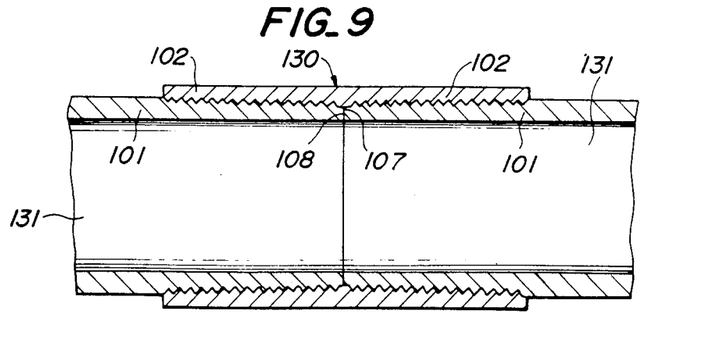
FIG. 9 is a diagrammatic sectional view of yet another embodiment of connector according to the present invention.

While as described above, surface 8 or 108 on the female member is shown as being formed integrally therewith, this surface may be provided by another member, which is permanently or releasably fixed to the female member. For example, as shown in FIG. 9, which shows an arrangement similar to that shown in FIG. 7 with a sleeve 130 providing two female members 102 each engageable with a male member 101, considering either of the male members 101 with a sealing surface 107, the sealing surface 108 may be provided by the end surface 107 of the other male member which has previously been engaged with the sleeve. In this embodiment the sealing surfaces 7, 8 and 107, 108 may have the forms described in copending U.K. Patent Application No. 8323508.

It will also be appreciated that the above described connector is applicable to other types of pipe connectors, such as pin and box type connectors where both the male member and the female member are made or formed integrally with a pipe, and to connecting other tubular or solid elongate, e.g. cylindrical, members, such for example as structural tubular members, pile driving pipe strings, drill collars and tool joints.

For use in connecting pipes for conveying pressurized fluids, such as oil or gas or steam, and in oil or gas exploration and production, the male member is formed integrally on the end of a metal tubular member and the female member is also made of metal and formed integrally on the end of a metal tubular member or as part of a sleeve. The metal may be steel, for example high tensile steel. Where the connector is used for conveying a corrosive fluid which contacts both members, they are advantageously both made of the same material. Where contact between the fluid conveyed and both members does not occur, as for example in the embodiment of FIG. 9, the material of the female member may be a higher grade than that used for the male member so that the overall dimensions of the female member can be reduced.

Although as described above, each member is provided with a single start thread, the members may be provided with multistart threads. Additionally, although the threads illustrated are buttress threads, it will be appreciated that other suitable forms of threads may be used.

What is claimed is:

1. A pipe connector including a female member having an internal circumferential surface provided with a thread and a male member having an external circumferential surface provided with a thread for threaded engagement with the thread of the female member, the male member being provided adjacent one end of the threaded surface thereof with an annular sealing surface which lies in a plane substantially perpendicular to a central axis of a connection of the male and female members, when the male and female members are fully engaged together, and which is brought under an axially directed force into sealing abutment with an annular sealing surface associated with the female member, which lies in a plane substantially perpendicular to the central axis of the connection of the male and female members, when the members are fully engaged together, wherein in an intermediate portion of the threaded surfaces of the members intermediate the ends, the threads of the members have the same pitch, and in one end portion of the threaded surfaces of the male member and the corresponding one end portion of the threaded surface of the female member, said one end portions extending between the intermediate portions and the sealing surfaces, the pitch of the thread of one member differs from the pitch of the thread of the other member, such that, as the members are screwed together, on abutment of the sealing surfaces, a part of at least one flank of the thread of one member in the intermediate portion abuts the corresponding part of the corresponding one flank of the thread of the other member in the intermediate portion, and as the axial load on the sealing surfaces increases, the one flanks of the threads in the intermediate portion are progressively loaded and the one flanks of the threads of the members in the one end portion are progressively brought into abutment and loaded.

2. A pipe connector as set forth in claim 1, wherein the threaded surfaces of the members comprise another end portion extending between the intermediate portion and the other ends of the threads, and the pitch of the thread of one of the members differs from the pitch of the thread of the other member in the other end portion such that, on application of a tensile force to the connector, when the members are fully engaged together, the one flanks of the threads in at least the intermediate portion are additionally loaded and the one flanks of the threads in the other end portion are progressively loaded as the tensile force increases.

3. A pipe connector including a female member having an internal circumferential surface provided with a thread, and a male member having an external circumferential surface provided with a thread for threaded engagement with the thread of the female member, the male member being provided adjacent one end of the threaded surface thereof with an annular sealing surface which lies in a plane substantially perpendicular to a central axis of a connection of the male and female members, when the male and female members are fully engaged together, and which is brought into abutment with an annular sealing surface associated with the female member, which lies in a plane substantially perpendicular to the central axis of the connection between the male and female members, when the members are fully engaged together under an axially directed force which places part at least of one member in compression and part at least of the other member in tension, wherein in an intermediate portion of the threaded surfaces of the members intermediate the ends, the threads of the members have the same pitch, and in one end portion of the threaded surfaces extending between the intermediate portion and the sealing surfaces, the pitch of the thread of the one member is greater than the pitch of the thread of the other member.

4. A pipe connector as set forth in claim 3, wherein the threaded surfaces of the members comprise another end portion extending between the intermediate portion and the other ends of the threads, and the pitch of the thread of the one member is smaller than the pitch of the thread of the other member.

5. A pipe connector as set forth in claim 1 or 3, wherein the thread of one of the members has the same pitch in the intermediate portion and in the one end portion, the thread of the other member having different pitches in the intermediate portion and in the one end portion.

6. A pipe connector as set forth in claim 2 or 4, wherein the thread of one of the members has the same pitch in the intermediate portion and in the other end portion the thread of the other member having different pitches in the intermediate portion and in the other end portion.

7. A pipe connector as set forth in claim 1 or 3, wherein the circumferential surfaces of the members are cylindrical.

8. A pipe connector as set forth in claim 1 or 3, wherein the circumferential surfaces of the members are frusto-conical, the frusto-conical surface of the male member tapering outwardly thereof and the frusto-conical surface of the female member tapering inwardly thereof.

9. A pipe connector as set forth in claim 1 or 3, wherein the sealing surface associated with the female member is provided by a surface of the female member itself.

10. A pipe connector as set forth in claim 1 or 3, wherein the sealing surface associated with the female member is provided by a surface of another member engaged with the female member.

11. A pipe connector as set forth in claim 1 or 3, wherein the sealing surface of the male member is provided in the region of the free end thereof and the sealing surface associated with the female member is provided internally thereof.

12. A pipe connector as set forth in claim 1 or 3, wherein the sealing surface of the male member is provided by an external surface on the male member and the sealing surface associated with the female member is provided by a surface of the female member in the region of the free end thereof.

13. A pipe connector as set forth in claim 1 or 3, wherein the sealing surface on the male member is provided at the free end thereof and the pitch of the thread in the intermediate portion and one end portion thereof is the same, and smaller than the pitch of the thread in the other end portion, and the pitch of the thread of the female member in the intermediate portion and the other end portion is the same and smaller than the pitch of the thread in the one end portion.

14. A pipe connector as set forth in claim 1 or 3, wherein the threads on the members are shaped to provide, on full engagement of the members, a clearance between the other flanks of the threads.

15. A pipe connector as set forth in claim 1 or 3, wherein the threads of the members are shaped to provide, on full engagement of the members, clearance between a crest surface of each thread and a corresponding root surface of the gap between the turns of the threads.

16. A pipe connector as set forth in claim 1 or 3, wherein the threads on the members are shaped to provide, on full engagement of the members, contact between a crest surface of one of the threads and a root surface of the gap between the turns of the other threads, and clearance between a crest surface of the other thread and a root surface of the gap between the turns of the one thread.

17. A pipe connector as set forth in claim 1 or 3, wherein the threads of the members are shape to provide, on full engagement of the members, an interference fit between a crest surface of one of the threads and a root surface of the gap between the turns of the other one of the threads, and a clearance between a crest surface of the other thread and a root surface of the gap between the turns of the one thread.

18. A pipe connector as set forth in claim 1 or 3, wherein the threads on the members are made with a gap between the turns thereof having a constant axial width throughout the length of each threaded surface, the axial thickness of the turns of the threads being varied to vary the pitch thereof.

19. A pipe connector as set forth in claim 1 or 3, wherein intermediate the ends of the threaded surfaces, the threaded surface of one of the members is provided with an annular groove and a resiliently compressible sealing ring, against which the thread of the other member seals, is housed in the annular groove.

20. A pipe connector as set forth in claim 19, wherein the annular groove is provided in the female member in the region of the junction between the intermediate and one end portions.

21. A pipe connector as set forth in claim 1, wherein the threaded surfaces of the members comprise another end portion extending between the intermediate portion and the other ends of the threads, and the pitch of the thread of the one member is smaller than the pitch of the thread of the other member.

* * * * *